Dec. 8, 1964     W. G. NEUBAUER     3,160,224
SOUND VELOCITY METER
Filed Feb. 26, 1960     2 Sheets-Sheet 1
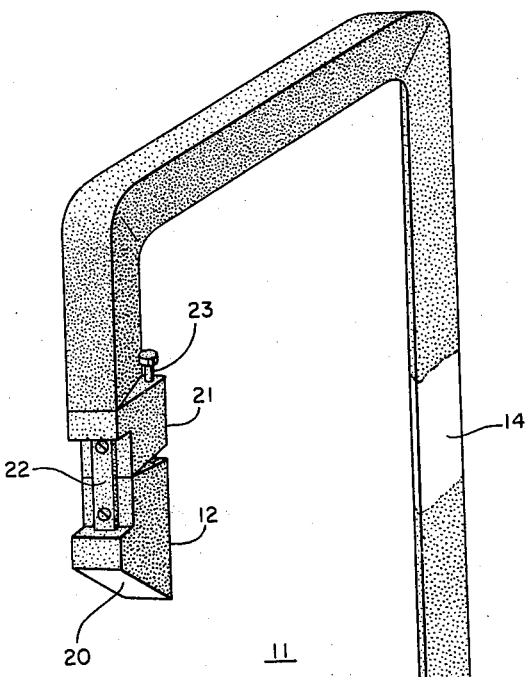
FIG_1
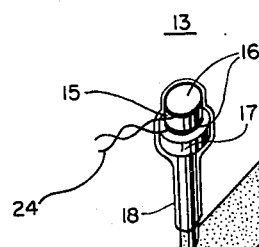
INVENTOR
WERNER G. NEUBAUER
BY *Richard O. Reed*
ATTORNEY Dec. 8, 1964  W. G. NEUBAUER  3,160,224
SOUND VELOCITY METER
Filed Feb. 26, 1960  2 Sheets-Sheet 2
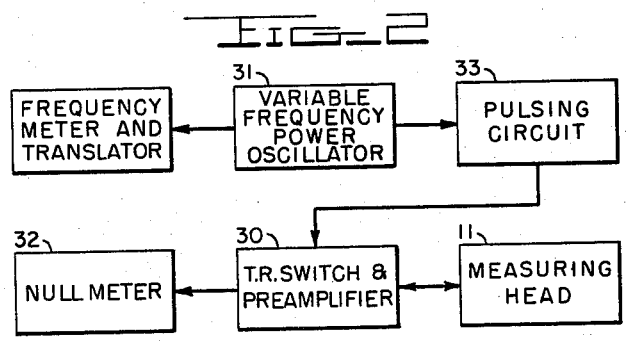
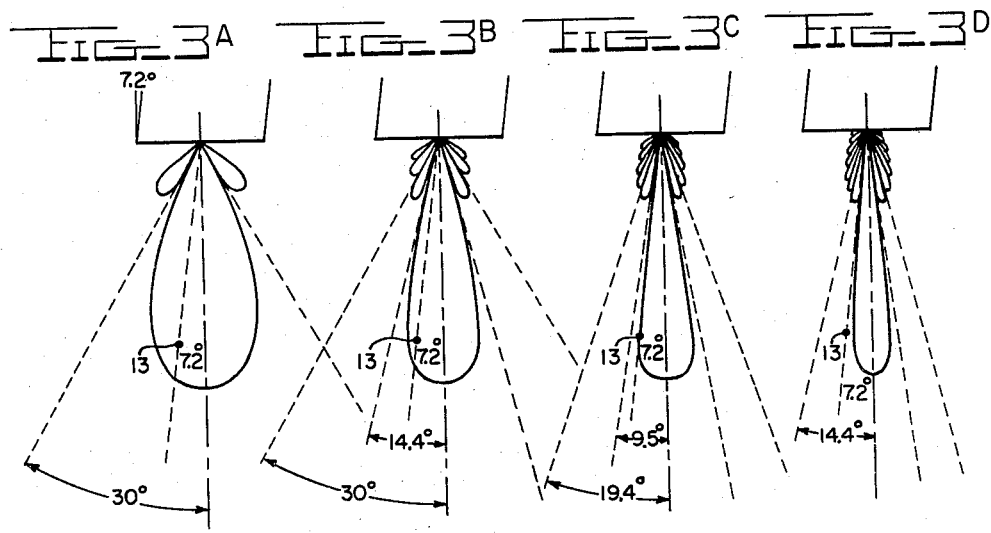
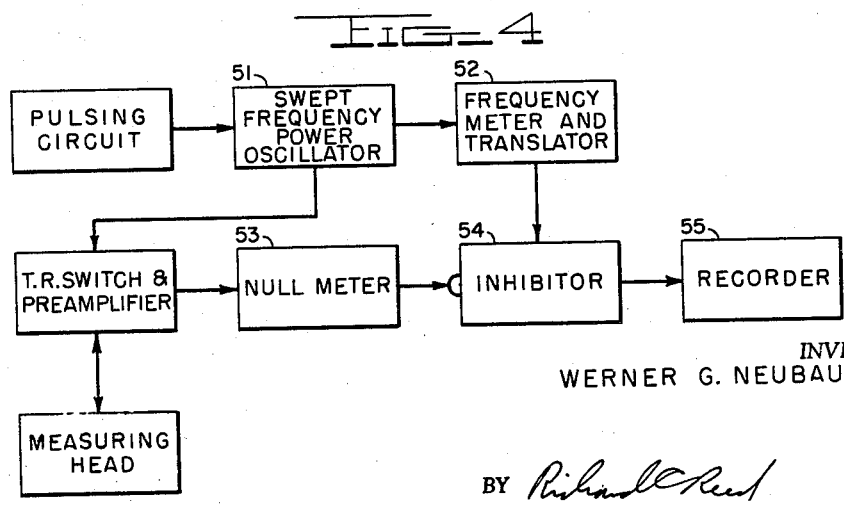
INVENTOR
WERNER G. NEUBAUER
BY
ATTORNEY

United States Patent Office 3,160,224
Patented Dec. 8, 1964

3,160,224
SOUND VELOCITY METER
Werner G. Neubauer, 4175 Abingdon St., Arlington, Va.
Filed Feb. 26, 1960, Ser. No. 11,388
7 Claims. (Cl. 181—.5)
(Granted under Title 35, U.S. Code (1952), sec. 266)

The invention described herein may be manufactured and used by or for the Government of the United States of America for governmental purposes without the payment of any royalties thereon or therefor.

This invention relates to a method and means for measuring the velocity of sound in a specific medium. More particularly it involves a novel method and apparatus wherein the velocity of sound in a medium is determined from the geometry of sound reflections produced by a standard target immersed therein.

The devices presently used for precise determinations of sound velocity in various media are complex delicately balanced structures. Invariably these structures contain a sound path of a precise predetermined length and means to measure the time delay of a wave traversing this path. The path length, which is subject to change with the temperature and pressure of the medium, must, therefore, be compensated and the timing devices must be quite complex and precise to obtain accurate measurements.

One object of the present invention is, therefore, to provide a method of measuring sound velocity which does not require linear measurement of a sound path.

A further object of this invention is to provide a sound velocity meter which is compact and reliable.

A still further object of the invention is to provide a sound velocity meter which is easily fabricated.

Another object of the present invention is to provide a sound velocity meter which may be used under water and which, if damaged, can easily be repaired and/or recalibrated.

These and other objects of the invention will be best understood with reference to the accompanying drawings wherein;

FIG. 1 shows a sound measuring head assembly according to the invention;

FIG. 2 shows a manually operated sound velocity metering system employing the head assembly of FIG. 1;

FIGS. 3a–3d show the sound patterns produced in the same media by harmonically related frequencies applied to the assembly of FIG. 1; and FIG. 4 shows an automatic metering system according to the invention.

Referring to FIG. 1 the measuring head assembly 11 of the invention comprises a target 12, a transducer 13 and a supporting arm 14 or bracket interconnecting the two. The target consists of a block of material having an acoustic impedance which differs substantially from that of the medium in which the velocity measurements are to be made. In the case of fluids the most satisfactory reflecting materials are solids with high acoustic impedance. The shape of the target is fairly arbitrary, although as will be explained later this characteristic has considerable effect on the operation of the device.

The transducer 13 must be capable of both sending and receiving sound energy. Separate elements may be used for each function, although numerous reciprocal transceiver devices are available. The embodiment shown employs a small disc 15 of electrostrictive or piezoelectric material, e.g., barium titanate, quartz, ADP or lead zirconate having electrodes 16 plated on the opposed sides thereof. The back of the crystal is shielded by vibration absorbing material 17, such as unicellular rubber which also acts as an acoustic baffle, and the entire transducing unit may be waterproofed by a thin sound transparent layer 18 of neoprene.

The arm 14, in this case a C-shaped bracket, is formed of metal such as brass, aluminum, or other material which provides rigidity and resists the attack of seawater. The cross-section of the arm is designed to present a minimum reflecting surface to the transducer. For example, the cross-section may be triangular with the most acute angle thereof directed toward the transducer. This configuration greatly reduces the interfering energy reflected from the bracket and subsequently picked up by the transducer. Further reduction may be obtained, if necessary, by coating the arm and other unwanted reflecting surfaces with a layer 19 of sound absorbing material such as the aluminum loaded rubber.

A suitable target is a cube with one face 20 cut off at an angle. A similar target is obtained by rotating the cube a few degrees, but this introduces a second reflecting face which leads ultimately to a less precise meter reading. The single flat face 20 is easily fabricated and provides a very desirable reflection pattern. Curved or periodic faces can be evolved which are satisfactory, but they entail unnecessary extra fabrication steps. Since the accuracy of the device depends on the dimensional stability of the target under environmental conditions such as temperature and pressure, the target is best constructed from a solid block of dimensionally stable material such as Invar which has a thermal expansion coefficient of $0.8 \times 10^{-6}$ per ° C. In order to make fine adjustments of the angle of the face the block is clamped firmly to a base 21 by means of a spring hinge 22. A screw 23 threaded through the block urges the unhinged edge of the block away from the edge against the tension of the hinge.

One system in which the device may be used is shown in FIG. 2. The measuring head assembly is immersed in a liquid medium and connected to the remainder of the system by means of one or more fluid tight cables. For deep water use the head assembly will usually carry a conventional preamplifier and TR switch 30, otherwise these additional elements are located at the surface end of the cables.

Input signals are supplied to the measuring head from a variable frequency power oscillator 31, and reflected echo signals from the measuring head are fed to a null detector or meter 32. Signals reflected from the measuring head will have a radiation pattern determined by the size of the head in wavelengths. The wavelength dimension is determined by the frequency of the signal and the velocity of propagation of that signal in the media being used. The radiation pattern will have the usual major and minor lobes with nulls dispersed between each lobe as shown in FIG. 2. Nulls could be sensed by transducer 13 by mechanically changing the angle of the head in that the radiation pattern would sweep across the transducer. Alternatively, and as specifically taught by this invention, the head can be disposed at a small angle with respect to the transducer and the signal frequency changed so that the major lobe of the reflected signal radiation pattern becomes narrower and eventually becomes sufficiently narrow to place transducer 13 in a null as shown in FIG. 3d. The frequency at which a null occurs when using a given target head size will give the velocity. The oscillator is controlled by a pulsing unit 33 to provide intermittent pulses from the oscillator separated by silent periods for null detection. The TR switch connects the transducer 13 in FIG. 1 to the oscillator when the pulsing unit is "on" and to the null detector during the intervening silent or quiescent periods.

Since the time required for a pulse to travel through a liquid medium from the transducer to the target and return will generally be quite short (a few hundred microseconds), the TR switch will generally be an electronic circuit which responds to the oscillator or pulsing circuit output. For large measuring heads and/or media having slow propagation velocity, e.g., gases, mechanical switches may be used. In some cases the pulsing circuit may be incorporated in and/or operate only the TR switch, the oscillator being pulsed by the latter. TR switches have been developed in great numbers for Sonar, Radar, and allied systems, so that these devices are well known and no further discussion of their properties is deemed necessary here.

The frequency meter and null detector are key elements in the system since the calculations of the unknown velocity depends in part on the precision with which the frequency can be measured. Tuned circuit meters may be employed, but cycle counting circuits, such as the Eccles-Jordan type are preferred. The simplest form of null detector is a rectifier and galvanometer in series. The sensitivity of this arrangement is affected by the gain of the preamplifier which is made as high as practicable. Additional feedback amplifiers may also be used in the null detector itself to provide extra sensitivity. Ambient noise usually limits the ultimate sharpness of the null, although accuracies of better than 0.5% in measured velocity have been obtained without difficulty.

FIG. 3a–3d show examples of the general form of the reflection patterns from targets bombarded with sound of progressively higher harmonically related frequencies. As is shown, a null will be perceived in a medium at a head angle and some given frequency when the target face is one, two, three and four wavelengths wide viewing the pattern from left to right. In FIG. 3a, for example, there is shown a typical target pattern wherein the target head is one wavelength square and in order for a null to be detected, at the frequency normally associated with a velocity in a known media, the target head must be inclined at a 30° angle. In FIG. 3d, for example, the target head size is four wavelengths on a side and when the head is inclined at 7.2° a first null will occur. A second null would also occur, if the frequency remained the same, and the target head were inclined 14.4° etc. The same pattern as shown in FIG. 3d could be achieved from FIG. 3a, by merely making the frequency four times as great. These same patterns are obtained using the frequency from FIG. 3a, and halving the velocity of the media from left to right. The number of lobes and their angular boundaries or nulls depend on the ratio of the wavelength of the target face to that of the frequency applied. Thus, once a target size is adopted, the pattern at a particular frequency in a medium having a given sound propagation velocity can be mapped. It is also apparent that the same pattern can occur in media with different propagation velocities provided the frequency is altered to hold the wavelength constant. In each case the transducer is placed far enough from the target that the curvature of the wavefront can be ignored. The size of the targets in this figure are obviously greatly exaggerated.

In choosing the size of target it is helpful to tabulate the angular inclination it must have to achieve a null from various size targets. In Table A below the angles of the first two nulls relative to a normal to the target surface are given for seven target sizes ranging from one to seven wavelengths.

*Table A*

| Target Size | First Null, degrees | Second Null, degrees |
|---|---|---|
| λ | 30.0 | 0.0 |
| 2λ | 14.4 | 30.0 |
| 3λ | 9.5 | 19.4 |
| 4λ | 7.2 | 14.4 |
| 5λ | 5.7 | 10.4 |
| 6λ | 4.6 | 9.6 |
| 7λ | 4.0 | 8.2 |

Using this data and the lowest value of velocity to be read by the meter, the parameters of the system are easily determined. For example, suppose that a meter to be used for measuring velocity in water solutions is to be limited to a least velocity of 4000 ft./sec. and a 4λ target 0.04 foot wide (roughly half an inch). Dividing the lowest velocity by the wavelength the lowest operating frequency is found to be 400 kilocycles. The target face is then fabricated from a cube approximately half an inch on a side. One face is planed off flat at approximately the angle of the first null, which from Table A is 7.2°.

The target is mounted on the arm with the transducer and if necessary in order to get a final fine adjust is tilted slightly by the adjusting screw 23. The measuring head is then immersed in a standard medium for which the velocity of sound is known, e.g., pure water at a standard temperature. The head is connected to the remainder of the system as shown for example in FIG. 2 and the frequency of the power oscillator raised from the lowest frequency to that which produces the first null. This frequency is then calibrated as indicative of the velocity of the standard medium. The remaining frequencies over the operating range are then calibrated in velocity in accordance with the formula:

$$v = \frac{f}{f_w} v_w$$

where $f_w$ and $v_w$ are the frequency and velocity, respectively, of the standard medium and $f$ and $v$ are similar quantities for unknown media. Therefore, as can be seen from the example and formula above, once the frequency and velocity of a standard medium are known, or determined, the velocity of an unknown medium can be found, by using a known target head size, supplying a frequency to the target until a null is detected and then by substituting the detected frequency in the above equation the velocity of the unknown can be found.

Since there is more than one null, the possibility exists that the wrong null may be detected. This is obviated by always increasing the frequency from its lowest value for each measurement. Consider, for example, that the patterns in FIGS. 3a–3d result from different velocities in various media and are all caused by the lowest operating frequency. The pattern in 3d would result from a medium having the lowest velocity which could possibly be measured by the meter and therefore should be lower than that of any medium measured. The patterns in 3a–3c, therefore, represent typical patterns which might be encountered. Note that the measuring head transducer 13 always falls within the main central lobe in these media. Raising the frequency alters the patterns by narrowing the central lobe so that each becomes more like that on its right. It can thus be seen that the first null is always the first to be read. No ambiguity exists, therefore regardless of the frequency (i.e., velocity) range of the instrument. In general the range should be limited to that required for the specific media to be encountered, thereby keeping the bandwidth of the meter components low.

As can be seen in FIG. 1 the measuring head assembly is rugged, compact and reliable. Minor changes in the calibration due to accident or abuse are easily corrected by means of the adjusting screw. The adjusting screw and spring are made from the same material so that dimensional changes due to temperature or pressure will not introduce a couple in the target mounting.

FIG. 4 shows an automatic frequency measuring system. The system has essentially the same elements as that of FIG. 2 with a few exceptions. The oscillator 51 instead of being tuned manually is automatically swept through its frequency range at a rate many times slower than the repetition rate of the pulsing circuit. The frequency meter and translator 52 may be a frequency discriminator or ratio detector type circuit such as the Foster-Seely FM detector which supplys a D.C. analog of the frequency or a cycle counting circuit of the Eccles-Jordan type and which reads out in binary code the number of cycles in a selected harmonic of each oscillator pulse. Since the velocity is directly proportional to the frequency the analog amplitude may be adjusted to read directly in velocity units. Likewise with a counter circuit, by choosing a convenient harmonic and adjusting the target angle, with screw 23 in FIG. 1, this output can be read directly as velocity in any desired unit. The output of the null detector or meter controls an inhibitor gate 54, as well as or instead of a galvanometer, so that the gate is open only in coincidence with a null.

The output of the frequency-to-velocity-code-translator 52 is fed into the normal gate input. A utilization device, in this case a recorder 55, is coupled to the output of the gate and so receives only those velocity signals which correspond to nulls. The recorder may operate continuously or only in response to the gating action of the inhibitor. The inhibitor may be an electronic amplifier which is biased below cut-off by the output of the null detector between nulls. A chart recorder is preferred although punch tape, photographic and similar devices may be employed.

Numerous variations of the circuit of FIG. 4 are possible. Both the null detector output and the translator output may be recorded simultaneously without the inhibitor circuit. The recorder may be replaced by a transmitter to relay the velocity information to a distant point. A feedback path can be provided from the null detector output to automatic sweep circuits of the oscillator to narrow the sweep range to that portion of the spectrum in which a null occurs.

Obviously many modifications and variations of the present invention are possible in the light of the above teachings. It is therefore to be understood that within the scope of the appended claims the invention may be practiced otherwise than as specifically described.

What is claimed is:

1. A sound velocity meter comprising: transducer means to radiate and detect sound in a frequency band including a given frequency in a specific fluid medium; target means shaped and dimensioned to produce a pattern of reflected sound having angularly spaced lobes and nulls in response to sound of said given frequency originating at said transducer, said target means being connected in fixed angular relationship to said transducer means with the detecting portion thereof asymmetrically disposed in said pattern, whereby said portion coincides with a null for said given frequency radiated by said transducer; frequency sensitive means calibrated in velocity connected to said transducer for measuring the frequency of driving signals applied thereto; and a null detecting means connected to said transducer for detecting a null produced by the frequency driving signals acting upon said target head.

2. The meter according to claim 1 wherein the transducer is a bilateral element for converting electrical signals to sound in the medium and the reverse.

3. The meter according to claim 1 wherein the target and transducer are interconnected by a C-shaped arm, said arm having a cross-section, in any plane perpendicular to the plane of the arm and passing through said transducer, which is triangular in shape with the most acute angle thereof directed toward said transducer.

4. The meter according to claim 3 wherein said arm is coated with sound absorbing material.

5. The meter according to claim 1 including a frequency source connected to the input of said transducer means said source having automatic means for sweeping its frequency over said frequency band of the meter.

6. The meter according to claim 1 wherein said frequency sensitive means includes conversion means for generating an output electrical analog velocity signal as a function of frequency, a signal recorder, a normally open electronic gate coupling the output of said conversion means to said recorder, the control input of said gate being coupled to said null detector whereby said gate is biased closed except in the presence of a null.

7. The meter according to claim 1 wherein said target includes a plane face several wavelengths long presented to said transducer, said face being inclined to a normal from the radiating surface of said transducer through the center of the face by an angle not greater than thirty degrees.

References Cited in the file of this patent

UNITED STATES PATENTS

| 2,510,947 | Baker | June 13, 1950 |
| 2,758,663 | Snavely | Aug. 14, 1956 |
| 2,780,795 | Ambrosio | Feb. 5, 1957 |
| 2,894,595 | Brown | July 14, 1959 |